United States Patent [19]
Shanbhag

[11] Patent Number: 6,157,611
[45] Date of Patent: Dec. 5, 2000

[54] METHOD AND APPARATUS FOR TRANSMISSION AND CONSTRUCTION OF QUASI ORTHOGONAL VECTORS

[75] Inventor: Abhijit G. Shanbhag, San Diego, Calif.

[73] Assignee: Qualcomm Inc., San Diego, Calif.

[21] Appl. No.: 09/136,107

[22] Filed: Aug. 18, 1998

[51] Int. Cl.$^7$ .................................................... H04B 7/216
[52] U.S. Cl. ......................... 370/208; 370/342; 370/441; 375/140
[58] Field of Search .................................... 375/130, 150, 375/146, 140; 370/203, 208, 342, 709, 335, 441; 712/19; 382/260

[56] References Cited

U.S. PATENT DOCUMENTS

| | | | |
|---|---|---|---|
| 3,715,508 | 2/1973 | Blasbaig ................................... | 370/203 |
| 5,136,611 | 8/1992 | Kirimoto et al. ........................ | 375/130 |
| 5,463,657 | 10/1995 | Rice ........................................ | 375/150 |
| 5,550,935 | 8/1996 | Erdem et al. ........................... | 382/260 |
| 5,600,843 | 2/1997 | Kato et al. .............................. | 712/19 |
| 5,606,322 | 2/1997 | Allen et al. ............................. | 341/173 |
| 5,751,761 | 5/1998 | Gilhousen ............................... | 375/146 |
| 5,966,376 | 10/1999 | Rakib et al. ............................. | 370/342 |

OTHER PUBLICATIONS

Boxtas, et al. :4–Phase Sequences with Near–Optimum Correlation Properties IEEE Transactions on Information Theory 38(3): 1101–1113 (May 1992).

Golomb, Solomon "Shift–Register Sequences and Spread–Spectrum Communications" IEEE 3$^{rd}$ Int'l Symposium on Spread–Spectrum Techniques & Applications, pp. 14–15 (Jul. 1994).

*Primary Examiner*—Hassan Kizou
*Assistant Examiner*—John Pezzlo
*Attorney, Agent, or Firm*—Philip Wadsworth; Thomas R. Rouse; Byron Yafuso

[57] ABSTRACT

A transmission method in a communications system having orthogonal code vectors for transmitting message signals is taught. The method includes forming a first vector matrix using a first series of cyclic shifts and forming a second vector matrix using a second series of cyclic shifts. The first vector matrix is permuted to provide an orthogonal code and the permuting operations are determined. The method also sets forth applying the determined permuting operations to the second matrix to provide a quasi orthogonal code vector. The quasi orthogonal code vector is applied to a message signal to provide an encoded message signal and the encoded message signal is transmitted. The forming of the first matrix vector includes cyclic shifts of a sequence having a characteristic polynomial. The characteristic polynomial of the sequence can be a primitive polynomial with a degree r. The sequence is an m-sequence. The length of the orthogonal code vector is $n=2^r$ and the forming of the first vector matrix can require n−1 cyclic shifts. The first matrix is extended prior to permuting. The primitive polynomial is lifted to a quaternary polynomial. A sequence having the quaternary polynomial is as its characteristic polynomial is generated whereby the sequence thus formed is a Family A sequence and the step of forming the second matrix is formed according to the Family A sequence. The second matrix is also extended prior to permuting the second matrix. The second vector matrix is permuted to provide a mask and the mask is applied to an orthogonal code vector to provide the quasi orthogonal vector. The mask can be applied to a plurality of orthogonal vectors to provide a plurality of quasi orthogonal vectors.

16 Claims, 3 Drawing Sheets

METHOD AND APPARATUS FOR TRANSMISSION AND CONSTRUCTION OF QUASI ORTHOGONAL VECTORS

BACKGROUND OF THE INVENTION

I. Field of the Invention

This invention relates to the field of communications systems and, in particular, to the transmission of spread coded message signals within communications systems.

II. Description of the Prior Art

It is well known in the art of communications to mix message signals to be transmitted with spreading code vectors. This permits the message signals to be combined, transmitted, and separated from each other after transmission. The most useful feature of a set of code vectors suitable for this purpose is that the spreading code vectors are mutually orthogonal. This permits a theoretical interference of zero between the message signals. The code vectors most commonly used for this purpose are Walsh code vectors.

The total number of binary code vectors having a length n is $2^n$. However, of the total number of binary vectors $2^n$ within the total vector space, only n are mutually orthogonal. For example, when n=8 there are 256 different binary vectors. Only 8 of the 256 vectors are mutually orthogonal. Therefore, in a system wherein n=8 usually only 8 message signals can be combined and separated in this manner and only 8 users can be supported simultaneously. Likewise, if n=128 then 128 users can be supported simultaneously. Some of the vectors can be idle some of the time, thereby permitting more than n users to be serviced. However, the size of the code vectors still places a limitation on the size of the communications system.

A set W of code vectors w meeting the orthogonality requirement for a theoretical interference of zero can be represented as follows:

$$w_1 = [w_{1,1} w_{1,2} \ldots w_{1,n}]$$
$$w_2 = [w_{2,1} w_{2,2} \ldots w_{2,n}]$$
$$\vdots$$
$$w_n = [w_{n,1} w_{n,2} \ldots w_{n,n}]$$

wherein each vector $w_i$ is a column vector using a 0/1 alphabet or, equivalently, a −1/+1 alphabet. Hereinbelow, a set of code vectors using the 0/1 alphabet is expressed as $W_{b,n}$ and a set using the −1/+1 alphabet is expressed as $W_n$.

Since all vectors w in the set W are orthogonal to each other, the dot product of any two vectors in the set must be zero. This can be represented as:

$$(w_x, w_y) = 0$$

where x and y can have any values between 1 and n, x y and $(w_x, w_y)$ is equal to $$1/n \sum_{i=1}^{n} w_{x,i} w_{y,i}.$$

Equivalently, the above can be the following matrix product:

$$w_x^T w_y = 0$$

Also: $w_x^T w_x = n$.

Representing the ith data symbol to be transmitted as di and the total number of transmit signals as k, the total transmission signal S transmitted by a base station to a mobile station is:

$$S = \sum_{i=1}^{k} d_i w_i$$

The mobile station receives the total transmission signal S and tries to eliminate all message signals except its own.

In order to eliminate the other messages the mobile station can multiply signal S by the transpose of its own Walsh code vector. An example wherein i=1 is as follows:

$$w_1^T S = w_1^T \sum_{i=1}^{k} d_i w_i$$
$$= w_1^T \left( d_1 \underline{w}_1 + \sum_{i=2}^{k} d_i \underline{w}_i \right)$$

wherein the first term on the right side represents the wanted signal. The second term in the right side represents the interference from all of the remaining message signals mixed with their individual Walsh codes. Solving this equation yields:

$$w_1^T S = n d_1 + 0.$$

Thus, the separation of the transmitted message signals at the receiver depends on a zero correlation between the wanted signal and all of the other message signals.

In order to utilize communications systems as effectively as possible it is desirable to simultaneously transmit and separate as many message signals as possible. However, it is only possible to mix n message signals and separate them with zero interference because only n orthogonal vectors are available, as previously described. To overcome this limitation it is known to use quasi orthogonal functions. Quasi orthogonal vectors are vectors that are in addition to the n orthogonal vectors. Quasi orthogonal vectors have been selected from the remaining code vectors in the total binary $2^n$ vector space in order to provide as little interference as possible. Specifically, quasi orthogonal vectors are selected to provide a level of interference that is within acceptable limits, even though the level of interference is not zero.

In order to select quasi orthogonal vectors a computer search can be performed within the total $2^n$ vector space for binary (+1/−1 alphabet) masks. The masks can be applied to the orthogonal vectors to form a new set of vectors that are quasi orthogonal vectors. Applying a total of M masks to a set of Walsh code vectors $w_n$, the number of quasi orthogonal functions produced is: (M+1)n. Applying a mask m to a code vector $w \in W_n$ includes a component by component multiplication of the mask m and the orthogonal code vector w to give the new code vector:

$$w_m = w \cdot m$$

The interference resulting from the use of the new code vectors can be tested and the code vectors that provide the lowest correlation can be selected to provide a set of quasi orthogonal vectors. A plurality of such masking functions can be found in order to provide a plurality of sets of quasi orthogonal vectors from a single set of orthogonal vectors. In order to permit message signals mixed with the quasi orthogonal vectors found by the computer search to be separated from each other, the quasi orthogonal vectors should be mutually orthogonal with respect to each other.

There is a non-zero correlation between at least one code vector in the orthogonal set and one vector in the quasi orthogonal set.

Representing the quasi orthogonal vectors as v it can be shown that:

$$1/n \sum_{j=1}^{n} ((v, wj)^2) = \frac{1}{n}.$$

The goal in picking quasi orthogonal vectors v is to pick the vectors such that $$\max_{1 \leq i \leq n} \{|(\underline{v}, \underline{w}_i)|\}$$

is as small as possible.

Since their correlation is a useful measure of the amount of separation between vectors, the normalized correlation between two code vectors x and y can be defined as:

$$(\underline{x}, \underline{y}) = \frac{1}{n} \sum_{i=1}^{n} x_1 y_1^*$$

The correlation between two orthogonal vectors is zero. Lower absolute value of correlation results in better separation between message signals mixed with the orthogonal vectors and the ones mixed with quasi orthogonal vectors. Better signal separation results in lower interference between the signals at the time of decoding.

The mean square correlation between orthogonal vectors and their corresponding quasi orthogonal vectors where n is a power of two is $1/n$. The lower bound on the absolute value of correlation can be shown to have the value, $1/\sqrt{n}$. This quantity is referred to as the Holtzman lower bound. Masks have been found that meet the lower bound for cases wherein n is an even power of two. However, in cases where n is an odd power of two this bound has not been met with an equality. The lowest correlation found in the latter case is $\sqrt{2}/\sqrt{n}$. Therefore, the interference of the best quasi orthogonal vectors found in the odd power of two case using the computer search technique is X times the theoretical limit.

Thus it desirable to find additional quasi orthogonal vectors having lower correlation with the orthogonal vectors for the case wherein n is an odd power of $\sqrt{2}$, in order to expand the capacity of communications systems while maintaining acceptably low amounts of interference.

SUMMARY OF THE INVENTION

A transmission method in a communications system having orthogonal code vectors for transmitting message signals is taught. The method includes forming a first vector matrix using a first series of cyclic shifts and forming a second vector matrix using a second series of cyclic shifts. The first vector matrix is permuted to provide an orthogonal code and the permuting operations are determined. The method also sets forth applying the determined permuting operations to the second matrix to provide a quasi orthogonal code vector. The quasi orthogonal code vector is applied to a message signal to provide an encoded message signal and the encoded message signal is transmitted. The forming of the first matrix vector includes cyclic shifts of a sequence having a characteristic polynomial. The characteristic polynomial of the sequence can be a primitive polynomial with a degree r. The sequence is an m-sequence. The length of the orthogonal code vector is $n = 2^r$ and the forming of the first vector matrix can require $n-1$ cyclic shifts. The first matrix is extended prior to permuting. The primitive polynomial is lifted to a quaternary polynomial. A sequence having the quaternary polynomial as its characteristic polynomial is generated whereby the sequence thus formed is a Family A sequence and the step of forming the second matrix is formed according to the Family A sequence. The second matrix is also extended prior to permuting the second matrix. The second vector matrix is permuted to provide a mask and the mask is applied to an orthogonal code vector to provide the quasi orthogonal vector. The mask can be applied to a plurality of orthogonal vectors to provide a plurality of quasi orthogonal vectors.

BRIEF DESCRIPTION OF THE DRAWINGS

The features, objects, and advantages of the present invention will become more apparent from the detailed description set forth below when taken in conjunction with the drawings in which like reference characters identify corresponding elements throughout and wherein.

DETAILED DESCRIPTION OF THE INVENTION

In the signal transmission method of the present invention, masks m are constructed and applied to orthogonal code vectors in order to provide quasi orthogonal code vectors, wherein the masks are four phase or quaternary phase shift keying (QSPK) masks. Thus the masks m have an alphabet of four elements, $\{\pm 1, \pm j\}$, rather than two elements, where $j=\sqrt{-1}$ is the imaginary root of unity. It will be understood that the signal transmission method of the present invention can require two masks m when transmitting a message signal. One of the two masks can be used for the in phase (I) channel and one can be used for the out of phase (Q) channel.

In order to practice the transmission method of the present invention, the new masks m can be generated using linear feedback shift registers (LFSR). A $2^k$-ary LFSR sequence $s[t]$ is a sequence having a having symbols $\{0, 1, \ldots, 2^k-1\}$ where k is limited to the value 1 in the binary case and two in the quaternary case. The sequence satisfies a linear recurrence relationship of the form:

$$\sum_{i=0}^{r} c_i s(t + i) = 0 (\text{mod } 2^k), \forall\, t > 0$$

where $r \geq 1$ is the degree of the recursion. The coefficients $c_i$ belong to the set $\{0, 1, \ldots, 2^k-1\}$ and $c_r$ 0. This type of sequence $s[t]$ has a characteristic polynomial:

$$c(x) = \sum_{i=0}^{r} c_i x^i$$

When k=1, the sequence s[t] is periodic with a period that is less than or equal to $2^r-1$. If the period of the sequence s[t] reaches the maximum value $2^r-1$, the characteristic polynomial of s[t] is defined as a primitive polynomial and the sequence s[t] is an m-sequence.

Sequences of this type are taught in S. W. Golomb, "Shift Register Sequences," Holden Day, San Francisco, Calif., 1967.

A code C' includes one period of an m-sequence and one period of each of its cyclic shifts. Thus, the size of the code period of the code C' is $2^r-1$. The code C' can then be extended by appending a zero bit to each code word in C'. The zero is appended at the same bit location of each code word. The inclusion of an all zero vector in this manner forms the code matrix C form the code C'.

The code matrix C has a length $2^r$ and a size $2^r$. In one embodiment the code C can be columnwise and rowwise permuted to create the Walsh code $W_{b,2r}$ of size $2^r$. However, it is sufficient to obtain permutation matrix P such that the set of row vectors of the matrix product CP are the same as the set of row vectors of $W_{b,2r}$.

Figure 1:
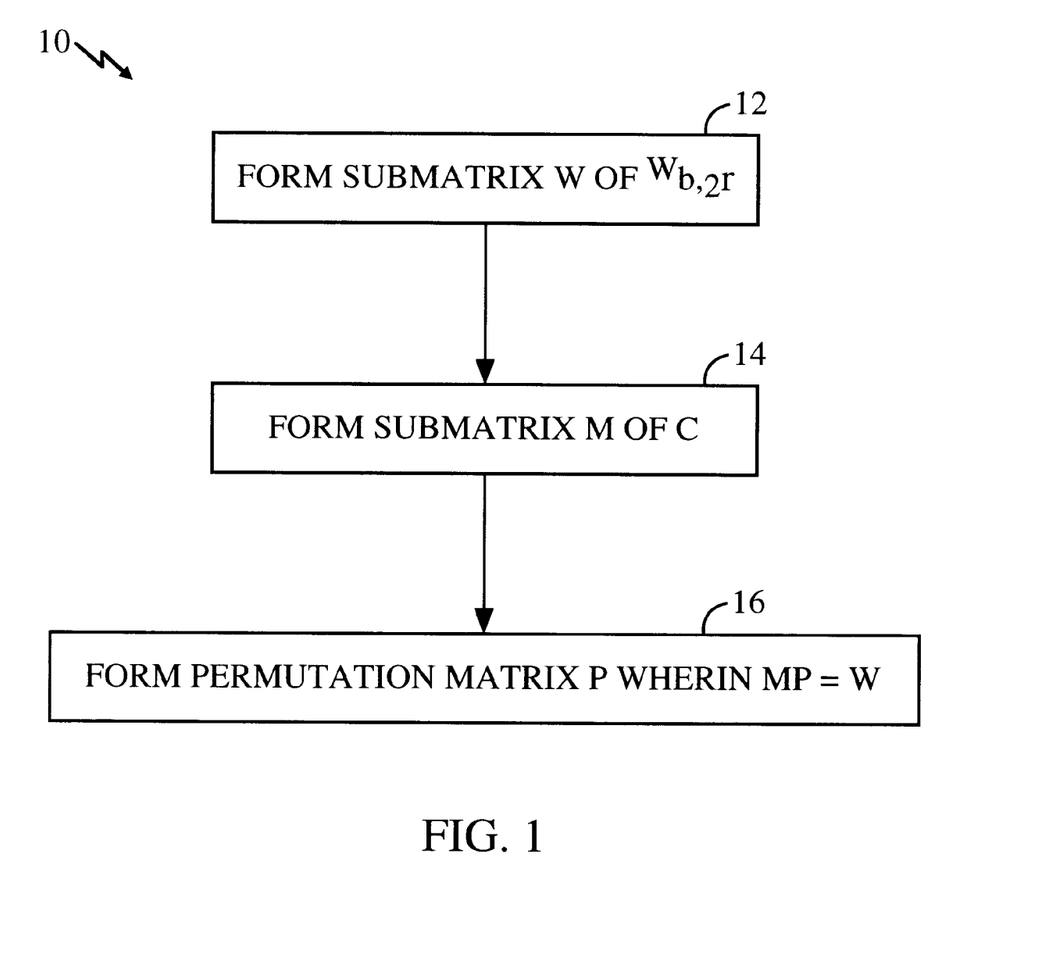
FIG. 1 shows a block diagram representation of a permutation matrix algorithm suitable for use in the method of the present invention.

Referring now to FIG. 1, there is shown permutation matrix algorithm 10 which is suitable for use in the present invention. In permutation matrix algorithm 10 a submatrix W of matrix $W_{b,2r}$ is formed as shown in block 12. The submatrix W includes r rows having indices 1, 2, 4, . . . , 2r-1. Note that the indexing of $W_{b,2r}$ is zero based and ranges from 0 to $2^r-1$. Matrix W therefore has r rows and $2^r$ columns. Every column of matrix W is distinct from all of the other columns.

A submatrix M of code matrix C is then formed as shown in block 14 of permutation matrix algorithm 10. Submatrix M has r rows and $2^r$ columns. In order to form submatrix M an intermediate submatrix M' having r rows and $2^{r-1}$ columns is formed.

Submatrix M' is formed by adding a column containing all zeros to submatrix M. The first row of submatrix M' can be any cyclic shift of the m-sequence used in constructing code C. The r-1 rows of submatrix M' following the first row are successive shifts by one time unit in each case beginning with the first row. Every column of submatrix M is distinct.

A permutation matrix P such that MP=W is then determined as set forth in block 16 of permutation matrix algorithm 10. Permutation matrix P is the required output of algorithm 10. Because submatrices M and W have the same set of distinct columns the determination of P in this manner is straightforward. In an alternate embodiment of the invention permutation matrix P can be determined using a matrix computation technique. It will be understood by those skilled in the art that the rows of the matrix CP are the same as the rows of $W_{b,2r}$.

When k=2, and sequences therefore have a quaternary alphabet, a sequence known as Family A can be determined. The Family A sequence is taught, for example, in S. Boztas, P. V. Kumar, R, Hammons, "4-Phase Sequences with Near-Optimum Correlation Properties," IEEE Transactions on Information Theory, IT-38 No. 3 (May 1992), pp 1101–1113. In order to obtain a Family A sequence, let c(y) be a binary primitive polynomial of degree r. A polynomial g(x) having coefficients in the set {0, 1, 2, 3 } can be lifted from the polynomial c(x) as follows:

$$g(x^2)=(-1)\,c(x)c(-x)(\bmod 4)$$

Such a lift of the binary polynomial c(x) to the quaternary polynomial g(x) is a special case of the Hensel lift of polynomials. For example, see B, R, MacDonald, "Finite Rings with Identity," Marcel Dekker, Inc., New York, 1974. The LFSR sequence with the characteristic polynomial g(x) is defined to be a Family A sequence. The sequence has a period $2^r-1$.

Figure 2:
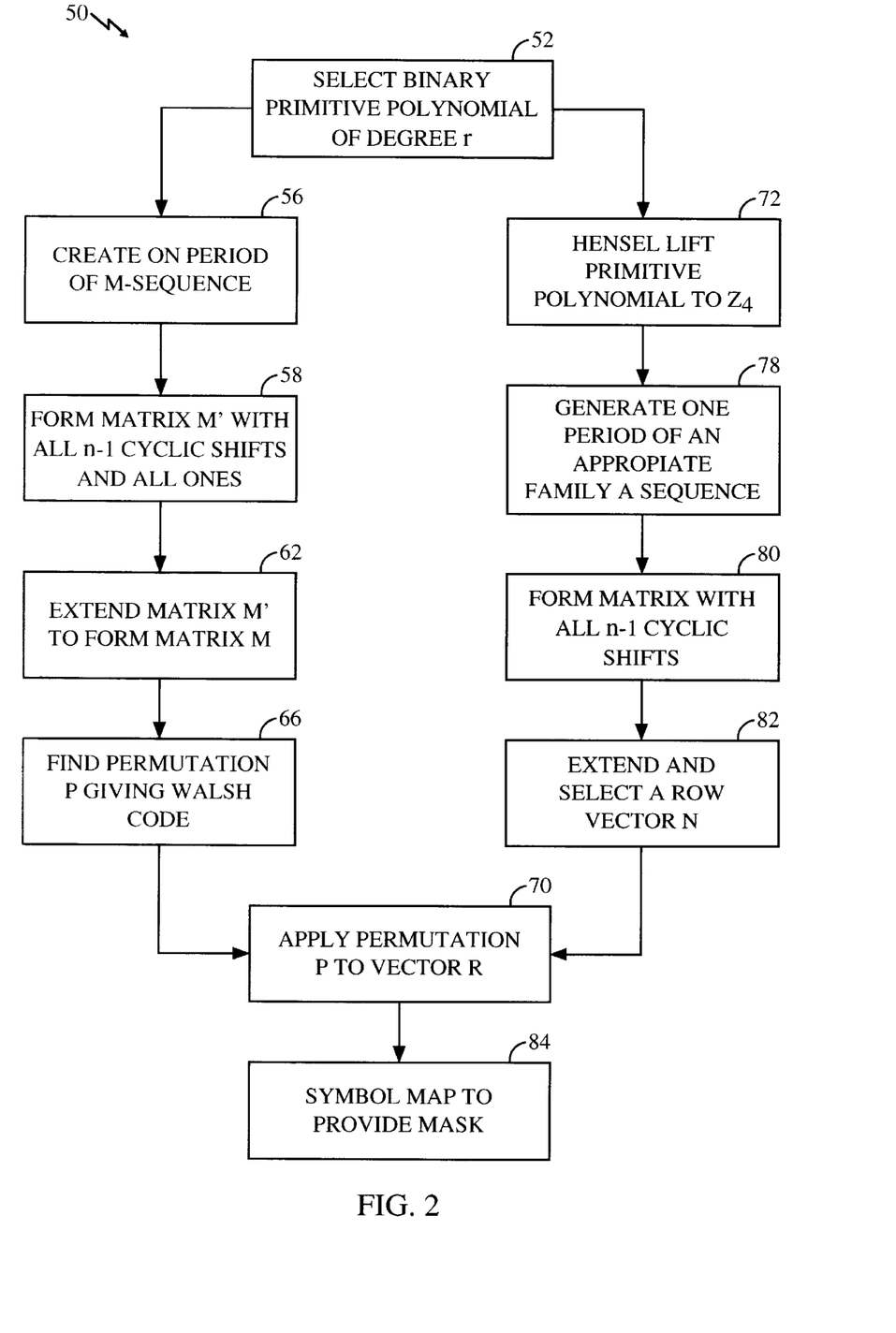
FIG. 2 shows a block diagram representation of the quasi orthogonal mask generation algorithm of the present invention.

Referring now to FIG. 2, there is shown quasi orthogonal mask generation algorithm 50. Quasi orthogonal mask generation algorithm 50 can be used to construct 4-phase masks for forming quasi orthogonal vectors of length $2^r$. In mask generation algorithm 50 a binary primitive polynomial c(x) of degree r is provided as shown in block 52. Using primitive polynomial c(x) as its characteristic polynomial, a period of an m-sequence is constructed as shown in block 56.

Matrix M' having dimensions $(2^r-1) \times (2^r_{-1})$ for the case where n=$2^r$ s constructed as shown in block 58. The rows of matrix M each contain a period of the m-sequence of block 56 along with all of its cyclic shifts. Matrix M' is then extended to form matrix M as shown in block 62. The extension of matrix M' is performed by adding an all zero column and an all zero row to matrix M'. The dimensions of matrix M are therefore $2^r \times 2^r$. For convenience, the first column of matrix M can be the all zero column. As set forth in block 56 a permutation P is found which column permutes the matrix M to contain the same row vectors as those contained in $W_{b,2^r}$. The permutation matrix method taught hereinabove, or any other method known to those skilled in the art, can be used to perform the operations of block 56.

A Hensel lift is then performed on the primitive polynomial c(x) obtained in block 52 of mask generation algorithm 50 to provide the polynomial g(x) as described hereinabove. The Hensel lift operation is shown in block 72. One period of the Family A sequences with the polynomial g(x) as its characteristic polynomial is generated as shown in block 78. A sequence of the Family A sequences is selected. The selected sequence can be any one of the Family A sequences having at least one symbol equal to 1 or 3.

A vector N' of length ($2^r-1$) is constructed. The vector N' consists of a period of the Family A sequence selected according to block 78. A vector N of length $2^r$ is formed by appending a zero bit at the first bit location to vector N'. As shown in block 70 the vector N is then column permuted using the permute P found in block 66. The resulting permuted code word can be used as a masking function for generating quasi orthogonal vectors according to the method of the present invention. The quasi orthogonal vectors generated in this manner can be used with symbol mapping to (+1, -1, +j, -j). A total of 127 masks can be generated in this manner for a length 128 Walsh code. Two of the masks generated according to quasi orthogonal mask algorithm 50 are set forth in Table I.

TABLE I

[1j1j1j1j1j1j1j1j1j1j1j1j-1-j-1-j-1-j-1-j1j1j-1-j-1-j1j1j-1-j
-1-j1j1j-1-j-1-j-1-j-1-j1j1j1j-1-j1j-1-j1j-1-j1j-1-j1j-1-j1j-1
-j-1-j1j-1-j1j1j-1-j-1-j1j1j-1-j-1-j1j1j-1-j-1-j1j-1-j1j1j-1-j]
[1j1j1j1j-1-j-1-j1j1j1j-1-j1j-1-j1j-1-j-1-j1j1-j1j1-j-1j-1j-1j-1j
-1j-1j1-j-1j1-j-1j1-j1j-1j1j-1j-1j-1-j1j1j-1-j1j1j-1-j1j-1-j1j1
-j1-j1-j1j-1j1-j-1-j1j-j1-j-1j1j1j-j-1-j1j1j1j1j1]

Figure 3:
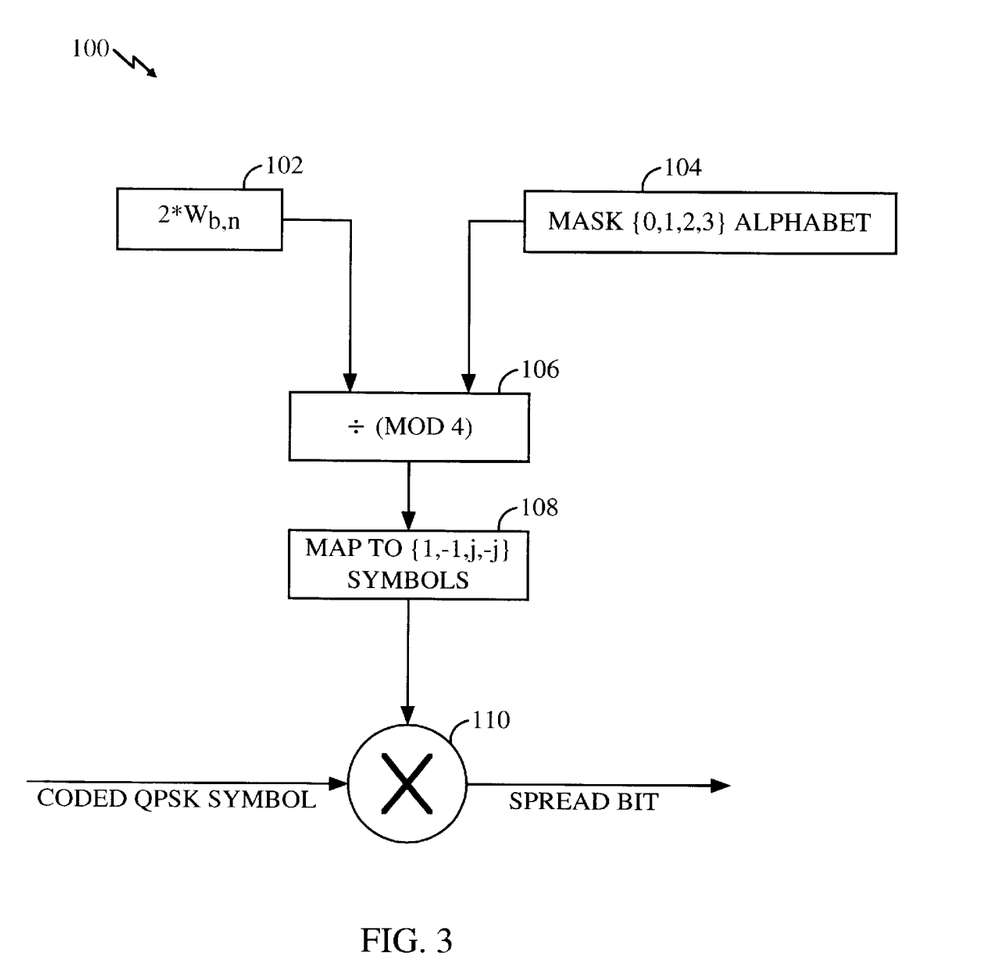
FIG. 3 shows a block diagram representation of a method for mapping vectors that is suitable for use in the method of the present invention.

Referring now to FIG. 3, there is shown vector mapping function 100. As shown in vector mapping function 100 a quasi orthogonal vector mask can be represented equivalently with symbols from the {0, 1, 2, 3} alphabet or with symbols from {+1, -1, +j, -j} alphabet of Table I using the mapping:

0→1

1→j

2→−1

3→−j

As shown in blocks 102, 104, respectively, the (0/1) Walsh code vectors (multiplied by two) and the masks in the {0, 1, 2, 3} alphabet can be added using modulo 4 adder 106. The result of the addition is mapped into a {+1, −1, +j, −j} alphabet as shown in mapping block 108. The output of mapping block 108 can be applied to coded QPSK symbols by mixer 110 to provide a coded message signal output for transmission.

The correlation between any code vector in the Walsh code and any code vector obtained by applying the masks of Table I to the Walsh code vectors is {±1/16±j/16}.

Thus, the maximum absolute correlation is $\frac{1}{8}\sqrt{2}=1\sqrt{n}$ and the theoretical lower bound on the correlation set forth hereinabove is met with equality. Furthermore, the method of quasi orthogonal mask generation algorithm 50 can be generalized to all powers of two to yield the optimal quasi orthogonal vectors for each power of two. Table II sets forth the correlations and the number of masks provided according to the method of the present invention for several powers of two.

TABLE II

| Length | Maximum Absolute Correlation With Walsh code | Correlation Spectrum | Number Of Available Masks |
|---|---|---|---|
| 32 | 0.177 | $\{\pm\frac{1}{8},\pm\frac{j}{8}\}$ | 31 |
| 64 | 0.125 | $\{\pm\frac{1}{8},\pm\frac{j}{8}\}$ | 63 |
| 128 | 0.0833 | $\{\pm\frac{1}{16},\pm\frac{j}{16}\}$ | 127 |
| 256 | 0.0625 | $\{\pm\frac{1}{16},\pm\frac{j}{16}\}$ | 255 |
| 512 | 0.0442 | $\{\pm\frac{1}{32},\pm\frac{j}{32}\}$ | 511 |

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A transmission method in a communications system having orthogonal code vectors for transmitting message signals, comprising the steps of:

(a) forming a first vector matrix using a first series of cyclic shifts;

(b) forming a second vector matrix using a second series of cyclic shifts;

(c) permuting the first vector matrix to provide an orthogonal code;

(d) determining the permuting operations of step (c);

(e) applying the determined permuting operations to the second matrix to provide a quasi orthogonal code vector; and (f) applying the quasi orthogonal code vector to a message signal to provide an encoded message signal and transmitting the encoded message signal.

2. The transmission method of claim 1, wherein step (a) comprises cyclic shifts of a sequence having a characteristic polynomial.

3. The transmission method of claim 2, wherein the characteristic polynomial of the sequence is a primitive polynomial.

4. The transmission method of claim 3, wherein the primitive polynomial has a degree r.

5. The transmission method of claim 4, wherein the sequence comprises an m-sequence.

6. The transmission method of claim 2, wherein $n=2^r$ is equal to the length of the orthogonal code vector and step (a) comprises n−1 cyclic shifts.

7. The transmission method of claim 6, comprising the step of extending the first matrix prior to permuting the first matrix.

8. The transmission method of claim 3, wherein the primitive polynomial is a binary polynomial comprising the step of lifting the binary polynomial to a quaternary polynomial.

9. The transmission method of claim 8, comprising the step of forming a sequence having the quaternary polynomial as its characteristic polynomial whereby the sequence thus formed is a Family A sequence.

10. The transmission method of claim 9, comprising the step of forming the second matrix according to the Family A sequence.

11. The transmission method of claim 10, comprising the step of extending the second matrix prior to permuting the second matrix.

12. The transmission method of claim 1, comprising the steps of:

(a) permuting the second vector matrix to provide a mask; and (b) applying the mask to an orthogonal code vector to provide the quasi orthogonal vector.

13. The transmission method of claim 12, comprising the step of applying the mask to a plurality of orthogonal vectors to provide a plurality of quasi orthogonal vectors.

14. The transmission method of claim 1, wherein the orthogonal code vector has a length n and the absolute value of correlation between the orthogonal vector and the quasi orthogonal vector is $1/\sqrt{n}$ for n any power of two.

15. A communications system having orthogonal code vectors for transmitting message signals, comprising:

(a) a first vector matrix formed by a first series of cyclic shifts;

(b) a second vector matrix formed by a second series of cyclic shifts;

(c) an orthogonal code vector formed by permutting the first vector matrix;

(d) a determination of the permuting operations of paragraph (c);

(e) a quasi orthogonal code vector formed by applying the determined permuting operations to the second matrix; and (f) an encoded message signal for transmission formed by applying the quasi orthogonal code vector to a message signal.

16. A transmission system in a communications system having orthogonal code vectors for transmitting message signals, comprising:

(a) means for forming a first vector matrix using a first series of cyclic shifts;

(b) means for forming a second vector matrix using a second series of cyclic shifts;

(c) means for permuting the first vector matrix to provide an orthogonal code vector from the first vector matrix;

(d) means for determining the permuting operations of step (c);

(e) means for applying the determined permuting operations to the second matrix to provide a quasi orthogonal code vector; and (f) means for applying the quasi orthogonal code vector to a message signal to provide an encoded message signal and transmitting the encoded message signal.

* * * * *

UNITED STATES PATENT AND TRADEMARK OFFICE
CERTIFICATE OF CORRECTION

PATENT NO.    : 6,157,611
DATED         : December 5, 2000
INVENTOR(S)   : Abhijit G. Shanbhag It is certified that error appears in the above-identified patent and that said Letters Patent is hereby corrected as shown below:

Column 3,
Line 24, replace "$x_1y_1*$" with -- $x_iy_i*$ --
Line 47, replace "$\sqrt{2}$" with -- 2 --

Column 4,
Line 56, replace "having a having" with -- having --
Line 66, replacve "$2^k{}_1$}" with -- $2^k-1$} --
Line 66, replace "$c_r\, 0$" with -- $c_r \neq 0$ --

Column 5,
Line 19, replace "code matrix C form" with -- code matrix C from --
Lines 23, 26, 29 and 31, replace "$W_{b,2r}$" with -- $W_{b,2}{}^r$ --
Line 66, replace "$g(x^2) = (-1)c(x)c(-x)(\text{mod } 4)$"

with --

$$g(x^2) = (-1)^r c(x)c(-x)(\text{mod } 4)$$

--

Column 6,
Line 16, indent beginning of paragraph
Line 16, replace "$(2^r{}_{-1})$" with -- $(2^r-1)$ --
Line 17, replace "s" with -- is --
Line 18, replace "matrix M each" with -- matrix M' each --
Line 25, replace "56" with -- 66 --
Line 29, replace "56" wih -- 66 --

UNITED STATES PATENT AND TRADEMARK OFFICE
CERTIFICATE OF CORRECTION

PATENT NO. : 6,157,611
DATED : December 5, 2000
INVENTOR(S) : Abhijit G. Shanbhag It is certified that error appears in the above-identified patent and that said Letters Patent is hereby corrected as shown below:

<u>Column 7,</u>
Line 19, replace "$\frac{1}{8}\sqrt{2} = 1\sqrt{n}$" with $--\frac{1}{8}\sqrt{2} = \frac{1}{\sqrt{n}}--$ Line 41, replace "$\left\{\pm\frac{1}{16}, \pm\frac{j}{16}\right\}$" with $--\left\{\pm\frac{1}{16} \pm\frac{j}{16}\right\}--$ Signed and Sealed this Second Day of July, 2002

*Attest:*

*Attesting Officer*

JAMES E. ROGAN
*Director of the United States Patent and Trademark Office*